United States Patent [19]

Tomita et al.

[11] Patent Number: 5,019,164

[45] Date of Patent: May 28, 1991

[54] WATER-RESISTANT INK COMPOSITION

[75] Inventors: Hajime Tomita; Yasuo Sonoda, both of Gunma, Japan

[73] Assignee: Kabushiki Kaisha Pilot, Tokyo, Japan

[21] Appl. No.: 520,189

[22] Filed: May 9, 1990

[30] Foreign Application Priority Data

May 10, 1989 [JP] Japan .................................. 1-115174

[51] Int. Cl.$^5$ .............................................. C09D 11/02
[52] U.S. Cl. ........................................ 106/22; 106/20
[58] Field of Search ...................................... 106/20, 22

[56] References Cited

U.S. PATENT DOCUMENTS

| | | | |
|---|---|---|---|
| 4,155,768 | 4/1979 | Adams et al. | 106/22 |
| 4,197,135 | 4/1980 | Bailey et al. | 106/22 |
| 4,299,630 | 11/1981 | Hwang | 106/20 |
| 4,629,748 | 12/1986 | Miyajima et al. | 106/20 |
| 4,659,382 | 4/1987 | Kang | 106/20 |
| 4,666,519 | 5/1987 | Akiyama et al. | 106/20 |
| 4,789,400 | 12/1988 | Solodar et al. | 106/22 |

FOREIGN PATENT DOCUMENTS 11-52176  6/1989  Japan .

OTHER PUBLICATIONS

*Chemical Abstracts*, "Water-Thinned Jet-Printing Inks Containing Polyallylalkylamines" 109:151672r.
*Chemical Abstracts* 97:129299m.
*Chemical Abstracts*, 110:175272g. Ariga, T. et al., *Chemical Abstracts*, 97:184143f.

Primary Examiner—Theodore Morris
Assistant Examiner—Mary C. DiNunzio
Attorney, Agent, or Firm—Beveridge, DeGrandi & Weilacher

[57] ABSTRACT

A water resistant ink composition is disclosed having a greatly improved water resistance and being excellent in resistance to drying-up, age stability and smooth ink flowability containing a mixture of polyamine compound having only primary amino groups and a molecular weight of 300 or more and a polyamine having primary amino groups removed therefrom, that is, having only secondary and/or tertiary amino groups and a molecular weight of 300 or more and combined with an anionic dye and a stabilizing agent such as urea or the like.

7 Claims, No Drawings

WATER-RESISTANT INK COMPOSITION

INTRODUCTION AND BACKGROUND

The present invention relates to an aqueous ink composition having high water resistance and excellent age stability and resistance to drying-up.

A variety of researches and developments with reference to aqueous ink compositions retaining water resistance have hitherto been conducted.

The so-called pigment type aqueous inks containing pigments as the main elements are well-known to the art. However, these pigment type aqueous inks are poor in dispersion stability and have the problem of sedimentation of pigment particles with time. When these inks are used for writing instruments, they tend to plug the ink passage and thus to inhibit the smooth flow of ink in the writing instrument. The deposition of the pigment particles along with the evaporation of water in this type of ink causes the plugging of the ink passage; the so-called drying-up phenomenon at the writing tip of a pen.

Thus, an aqueous ink composition having high water resistance, excellent age stability and resistance to drying-up has been desired to be developed.

SUMMARY OF THE INVENTION

It has now been determined that the so-called dye type aqueous ink compositions containing dyes as main elements can be relied on in order to solve the problems that have been encountered in the past.

Requisite conditions of ink such as the water resistance, age stability and resistance to drying-up of ink have been studied and examined.

In order to impart water resistance to the writing produced by the ink, it is required for the written characters to adequately bond to paper, and thus various materials were examined from the aspect of their adhesion properties.

A feature of the present invention resides in a composition containing a combination of a polyamine having a molecular weight of 300 or more and anionic dye which combination drastically improves the water resistance of the written matter.

Such improvement as described above is probably due to the insolubilization of the polyamine by the reaction with paper and the cationic property of the polyamine leading to the reaction with the anionic dye to work as a binder between the paper and the dye.

In addition, the combination according to the invention exhibits adhesiveness in an aqueous solution having a low viscosity and also affords water resistance to the dye.

However, if the polyamine has a primary amino group as the amino group, the primary amino group reacts strongly with the chromophore of the anionic dye thereby resulting in the discoloration of the dye and decreasing the solubility of the reaction product of the dye and the polyamine as well, so that sedimentation is caused and age stability is lowered.

However, it is essential for affording water resistance as described above to add a polyamine.

According to the present invention, if the amino group present in the polyamine is a secondary or tertiary amino group, its effect for affording water resistance is insufficient.

Investigation has hitherto been conducted on inks having added thereto a polyamine from which primary amino groups had been removed. However, such a polyamine cannot maintain the desired resistance to water. On the other hand, if the desired water resistance is intended to be obtained using a composition free of primary amino groups, the amount of the polyamine added must be necessarily increased thus leading to an increase in the viscosity. The higher viscosity inhibits the smooth flow of ink, and therefore the resulting ink can be employed only with difficulty in writing instruments. In addition, satisfactory penetration into the writing srface, such as paper or the like, cannot be obtained so that the reaction with the writing surface is conducted only on the interface. This leads to poor water resistance of the written material on the paper.

Therefore, it has been determined in accordance with the present invention that a primary amino group must be introduced into a polyamine in order to improve the water resistance.

First, the functions and effects of water resistance and resistance to drying-up were examined with reference to polyamines having a primary amino group and polyamines free of primary amino groups.

As a result, it has been found that the use of the mixture of a polyamine compound having only primary amino groups and a molecular weight of 300 or more and a polyamine having primary amino groups removed therefrom, that is, having only secondary and/or tertiary amino groups and a molecular weight of 300 or more and the combination of the mixture with an anionic dye and a stabilizing agent such as urea or the like produced a water resistant ink composition having an greatly improved water resistance and being excellent in resistance to drying-up, age stability and smooth ink flowability.

Further, it has been found that the use of the mixture of a polyamine compound having primary amino groups and secondary and/or tertiary amino groups and a molecular weight of 300 or more together with a polyamine having primary amino groups removed therefrom, that is, having only secondary and/or tertiary amino groups and a molecular weight of 300 or more and the combination of the mixture with an anionic dye and a stabilizing agent such as urea or the like results in a water resistant ink composition having a greatly improved water resistance and excellent resistance to drying-up, age stability and smooth ink flowability.

DETAILED DESCRIPTION OF THE INVENTION

Therefore, in one aspect the present invention resides in a water resistant ink composition comprising A. a polyamine mixture of (a) a polyamine compound containing primary amino groups and having a molecular weight of 300 or more and (b) one or more polyamine compound(s) selected from polyamines compounds containing secondary and/or tertiary amino groups and having a molecular weight of 300 or more, B. a stabilizing agent, C. water, and D. an anionic dye having a solubility of 10% by weight or more in an aqueous vehicle comprising said polyamine mixture, said stabilizing agent and water. The total amount of the polyamine compounds used is in the range of 0.5-5% by weight.

In a further aspect, the polyamine compound contains primary amino groups and has a molecular weight of 300 or more and is a polyamine free of secondary or tertiary amino groups.

A still further aspect of the invention relates to compositions wherein the polyamine compound containing primary amino groups and having a molecular weight of 300 or more is a polyamine compound having secondary or tertiary amino groups.

In the water resistant ink compositions according to the invention, the polyamine compound containing primary amino groups and having a molecular weight of 300 or more can be a polyamine compound in which a primary amino group is present in a proportion of 21% or more of the total amino groups contained per molecule, and the polyamine compound can be present in an amount of 2-50% by weight of the total polyamine compounds.

Still further, in the water resistant ink compositions according to the invention, the polyamine compound containing primary amino groups and having a molecular weight of 300 or more can be a polyamine compound in which a primary amino group is present in a proportion of less than 21% of the total amino groups contained per molecule, and the polyamine compound can be present in an amount of 10-90% by weight of the total polyamine compounds.

As the stabilizing agent, there can be used one or more of the compounds selected from urea, thiourea, ethylene urea, hydroxyethyl urea, hydroxypropyl urea, ethylene tiourea, diethyl thiourea, 2-pyrrolidone, polyvinyl pyrrolidone, sorbitol and dimethylsulfone.

One or more of wetting agent(s) such as ethylene glycol, diethylene glycol, propylene glycol, glycerin, triethylene glycol, dipropylene glycol, thiodiglycol, polyglycerin, polyethylene glycol, polypropylene glycol, methyl cellosolve, ethyl cellosolve, butyl cellosolve, methyl carbitol, ethyl carbitol and butyl carbitol can be added.

Typical of the polyamine compound (a) described above containing the primary amino groups and having a molecular weight of 300 or more is the polyamine compound containing only primary amino groups. A polyamine containing in addition to primary amino groups, secondary and/or tertiary amino groups can be also used.

In order to incorporate a useful amount of the primary amino groups in the ink composition, the polyamine compound (a) containing primary amino groups and having a molecular weight of 300 or more must be used in an amount of 2-50% by weight to the total polyamine compounds when the polyamine compound contains primary amino groups in a proportion of 21% or more to the total amino groups contained per molecule.

If the amount of the polyamine compound (a) is less than 2% by weight, water resistance cannot be afforded because of too little amount of the primary amino groups. If the amount exceeds 50% by weight, the reactivities of the primary amino groups are emphasized, so that the dyes are denaturated, the solubility of the reaction product of the dye and the polyamine decreases, sedimentation occurs or age stability becomes poor.

When the polyamine compound (a) containing primary amino groups and having a molecular weight of 300 or more contains only less than 21% of primary amino groups, it must be used in an amount of 10-90% by weight to the total amount of the polyamine compounds different from the case of the polyamine compound containing 21% or more of said primary amino groups.

If the amount is less than 10% by weight, water resistance cannot be afforded because of too little amount of the primary amino groups. If the amount exceeds 90% by weight, the total amount of the primary amino groups becomes too much and the secondary and/or tertiary amino groups serve only unsatisfactorily for controlling the reactivities of the primary amino groups, so that the dyes may be denaturated, the solubility of the reaction product of the dye and the polyamine decreases, sedimentation occurs or age stability becomes poor.

Examples of the polyamines used in the present invention are the following:

(1) polyamines containing primary amino groups:

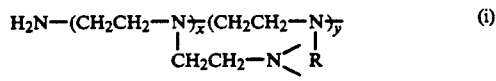

polyethyleneimine and its derivatives
(primary, secondary and tertiary amino groups)

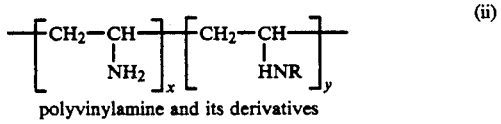

polyvinylamine and its derivatives

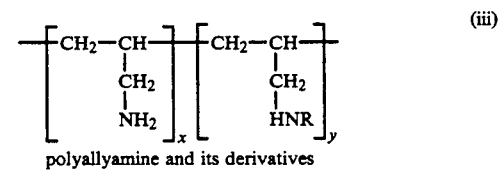

polyallyamine and its derivatives (2) polyamines containing secondary and tertiary amino groups:

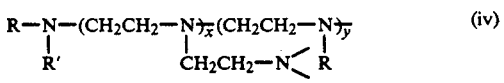

polyethyleneimine derivatives

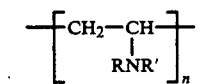

polyvinylamine derivatives

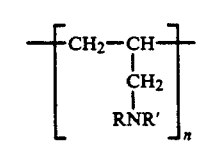

pollyallylamine derivatives wherein
R is the same or different and represents H or $CH_2CH_2OH$, $CH_2CH_2CH_2OH$, or $CH_3$ or the like;
R' represents $CH_2CH_2OH$, $CH_2CH_2CH_2OH$, or $CH_3$ or the like;
x denotes a numeral in the range of 1-1,000,
y denotes a numeral in the range of 1-1,700, and
n denotes a value so that the molecular weight is 300 or more.

Any of the above specific materials can be used in the example herein after below. In this connection, as the polyamine of the present invention, there can be used other polyamines such as allylamine or the like in addition to those derived from polyethyleneimine.

As the stabilizing agent used in the present invention, one or more of the compounds selected from urea, thiourea, ethylene urea, hydroxyethyl urea, hydroxypropyl urea, ethylene thiourea, diethyl thiourea, 2-pyrrolidone, polyvinyl pyrrolidone, sorbitol and dimethylsulfone are suitable.

Such stabilizing agents are probably considered to inhibit the anionic dye bonded to the polyamine from further association with each other and precipitation.

These stabilizing agents have excellent moisture retention and thus greatly contribute to improve the resistance to drying-up of ink.

The amount of the stabilizing agent incorporated is in a proportion of 5–30% by weight, preferably about 15% by weight to the mixture of the polyamine and water.

The anionic dye used in the present invention should have a solubility in the range of 10% by weight or more in a vehicle comprising the specific polyamine compound, water and the establishing agent. If an anionic dye having a solubility of less than 10% by weight, the age stability is not improved by various means because of its too little solubility.

The anionic dye used in the present invention is mainly selected from direct dyes or acid dyes, which are the ones having as hydrophilic groups anionic groups such as —SO₃Na, —COONa or the like.

For example, the direct dyes are Direct Black 19, 154, Direct Blue 87 and the like; and the acid dyes are Acid Blue 1, 9, 90 and 93, Acid Red 18, 27, 87, 92 and 94, Acid Yellow 23 and 79, and Acid Orange 10 and the like.

The blending of a wetting agent such as ethylene glycol to the water resistant ink composition exhibits further effective prevention of precipitation.

As the wetting agent used in the present invention, one or more of the compounds selected from ethylene glycol, diethylene glycol, propylene glycol, glycerin, triethylene glycol, dipropylene glycol, thiodiglycol, polyglycerin, polyethylene glycol, polypropylene glycol, methyl cellosolve, ethyl cellosolve, butyl cellosolve, methyl carbitol, ethyl carbitol and butyl carbitol are suitable. The amount of the wetting agent incorporated is preferably in the range of 10–30% by weight to the aqueous vehicle.

The present invention is described specifically with reference to Examples below.

EXAMPLE 1

A water resistant ink composition was prepared by uniformly blending the following components:

| | |
|---|---|
| Direct Black 154 | 4.5% by weight |
| (solubility in vehicle, 20% or more) | |
| Polyamine A1 | 0.1% by weight |
| (containing 33% of primary amino groups) | |
| Polyamine C1 | 0.4% by weight |
| (free of primary amino groups) | |
| ethylene glycol | 20.0% by weight |
| urea | 10.0% by weight |
| pH adjustor | 0.3% by weight |
| surfactant (GAFAC, RS-410, TOHO Chem.) | 0.5% by weight |
| anti-bacterial agent | 1.0% by weight |
| (Proxel XL-2, ICI)* | |
| deionized water | 63.5% by weight |

*10% 1,2-benziisothiazoline-3-one in propylene glycol solution

EXAMPLES 2–25

Water resistant ink compositions were prepared in the same manner as Example 1 except that the types and amount incorporated of the polyamine and the solubility of the dye with or without a wetting agent were changed.

The results of Examples 1–25 are presented in Table 1.

COMPARATIVE EXAMPLE 1–11

The results of Comparative Examples in the cases of the presence of a polyamine not within the invention, the absence of a stabilizing agent and the solubility of the anionic dye in the range of 10% by weight or less are presented in Table 2.

Numerals in Table 1 and Table 2 show the amount of weight percent.

TABLE 1

| Example | 1 | 2 | 3 | 4 | 5 | 6 | 7 | 8 | 9 | 10 |
|---|---|---|---|---|---|---|---|---|---|---|
| Direct Black 154 (Solubility ≧ 20%) | 4.5 | 4.5 | 4.5 | 4.5 | 4.5 | 4.5 | 4.5 | 4.5 | 4.5 | 4.5 |
| Acid Red 94 (Solubility ≧ 30%) | | | | | | | | | | |
| Acid Blue 90 (Solubility ≧ 30%) | | | | | | | | | | |
| Polyamine A1 | 0.1 | 0.5 | 0.3 | 0.1 | 0.5 | 0.3 | 0.3 | | | |
| Polyamine A2 | | | | | | | | 0.1 | 0.5 | 0.3 |
| Polyamine A3 | | | | | | | | | | |
| Polyamine B1 | | | | | | | | | | |
| Polyamine B2 | | | | | | | | | | |
| Polyamine B3 | | | | | | | | | | |
| Polyamine C1 | 0.4 | 4.5 | 1.7 | | | | | 0.4 | 4.5 | 1.7 |
| Polyamine C2 | | | | 0.4 | 4.5 | 1.7 | 1.7 | | | |
| Polyamine C3 | | | | | | | | | | |
| Ethylene glycol | 20.0 | 20.0 | 20.0 | 20.0 | 20.0 | | 20.0 | | | |
| Diethylene glycol | | | | | | | | 20.0 | 20.0 | 20.0 |
| Glycerin | | | | | | | | | | |
| Urea | 10.0 | 10.0 | 10.0 | 10.0 | 10.0 | 10.0 | 10.0 | 10.0 | 10.0 | 10.0 |
| pH adjuster | 0.3 | 0.3 | 0.3 | 0.3 | 0.3 | 0.3 | 0.3 | 0.3 | 0.3 | 0.3 |
| Surfactant | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance |
| Water resistence | ○ | ◉ | ◉ | ○ | ◉ | ◉ | ◉ | ○ | ◉ | ◉ |
| Age stability | ◉ | ○ | ◉ | ◉ | ○ | ◉ | ◉ | ◉ | ○ | ◉ |
| Resistence to drying-up | A | A | A | A | A | B | A | A | A | A |

TABLE 1-continued

| Example | 11 | 12 | 13 | 14 | 15 | 16 | 17 | 18 | 19 | 20 |
|---|---|---|---|---|---|---|---|---|---|---|
| Direct Black 154 (Solubility ≥ 20%) | 4.5 | 4.5 | 4.5 | 4.5 | 4.5 | 4.5 | 4.5 | | | |
| Acid Red 94 (Solubility ≥ 30%) | | | | | | | | 3.0 | 3.0 | 3.0 |
| Acid Blue 90 (Solubility ≥ 30%) | | | | | | | | | | |
| Polyamine A1 | | | | | | | | 0.1 | 0.5 | |
| Polyamine A2 | 0.1 | 0.5 | 0.3 | | | | | | | |
| Polyamine A3 | | | | 0.1 | | | | | | |
| Polyamine B1 | | | | | 3.0 | | | | | |
| Polyamine B2 | | | | | | 3.0 | | | | 3.0 |
| Polyamine B3 | | | | | | | 3.0 | | | |
| Polyamine C1 | | | | | | | | | | |
| Polyamine C2 | 0.4 | 4.5 | 1.7 | | 1.0 | 1.0 | 1.0 | 1.9 | 1.5 | 1.0 |
| Polyamine C3 | | | | 0.4 | | | | | | |
| Ethylene glycol | 10.0 | 10.0 | 10.0 | | 10.0 | 10.0 | 10.0 | 20.0 | 10.0 | 10.0 |
| Diethylene glycol | 10.0 | 10.0 | 10.0 | | | | | | | |
| Glycerin | | | | 20.0 | 10.0 | 10.0 | 10.0 | | | |
| Urea | 10.0 | 10.0 | 10.0 | 10.0 | 10.0 | 10.0 | 10.0 | 10.0 | 10.0 | 10.0 |
| pH adjuster | 0.3 | 0.3 | 0.3 | 0.3 | 0.3 | 0.3 | 0.3 | 0.1 | 0.1 | 0.1 |
| Surfactant | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance |
| Water resistence | ○ | ⊙ | ⊙ | ○ | ○ | ⊙ | ⊙ | ○ | ⊙ | ⊙ |
| Age stability | ⊙ | ○ | ⊙ | ⊙ | ⊙ | ⊙ | ⊙ | ⊙ | ⊙ | ○ |
| Resistence to drying-up | A | A | A | A | A | A | A | B | A | A |

| Example | 21 | 22 | 23 | 24 | 25 |
|---|---|---|---|---|---|
| Direct Black 154 (Solubility ≥ 20%) | | | | | |
| Acid Red 94 (Solubility ≥ 30%) | 3.0 | | | | |
| Acid Blue 90 (Solubility ≥ 30%) | | 3.0 | 3.0 | 3.0 | 3.0 |
| Polyamine A1 | 0.5 | 0.1 | 0.5 | | 0.5 |
| Polyamine A2 | | | | | |
| Polyamine A3 | | | | | |
| Polyamine B1 | | | | | |
| Polyamine B2 | | | | 3.0 | |
| Polyamine B3 | | | | | |
| Polyamine C1 | | | | | |
| Polyamine C2 | 1.5 | 1.9 | 1.5 | 1.0 | 1.5 |
| Polyamine C3 | | | | | |
| Ethylene glycol | | 30.0 | 30.0 | 30.0 | |
| Diethylene glycol | | | | | |
| Glycerin | | | | | |
| Urea | 10.0 | 10.0 | 10.0 | 10.0 | 10.0 |
| pH adjuster | 0.1 | 0.3 | 0.3 | 0.3 | 0.3 |
| Surfactant | 0.5 | 0.5 | 0.5 | 0.5 | 0.5 |
| Antibacterial agent | 1.0 | 1.0 | 1.0 | 1.0 | 1.0 |
| Deionized water | Balance | Balance | Balance | Balance | Balance |
| Water resistence | ⊙ | ○ | ⊙ | ⊙ | ⊙ |
| Age stability | ⊙ | ⊙ | ⊙ | ○ | ⊙ |
| Resistence to drying-up | B | A | A | A | B |

TABLE 2

| Comparative Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Direct Black 154 (Solubility ≥ 20%) | 4.5 | 4.5 | 4.5 | 4.5 | | | | | | | | | | |
| Acid Black 2 (Solubility < 10%) | | | | | 4.5 | | | | | | | | | |
| Acid Red 94 (Solubility ≥ 30%) | | | | | | 3.0 | 3.0 | 3.0 | 3.0 | | | | | |
| Acid Red 73 (Solubility < 5%) | | | | | | | | | | 3.0 | | | | |
| Acid Blue 90 (Solubility ≥ 30%) | | | | | | | | | | | 3.0 | 3.0 | 3.0 | |
| Acid Blue 15 (Solubility < 10%) | | | | | | | | | | | | | | 3.0 |
| Polyamine A1 | | | | 0.1 | 0.1 | | | | 0.1 | 0.1 | | | 0.1 | 0.1 |
| Polyamine A2 | | 3.0 | | | | | | 2.0 | | | | 3.0 | | |
| Polyamine A3 | | | | | | | | | | | | | | |
| Polyamine B1 | | | | | | | | | | | | | | |
| Polyamine B2 | | | | | | | | | | | | | | |
| Polyamine B3 | | | | | | | | | | | | | | |
| Polyamine C1 | | | | | | | | | | | | | | |

TABLE 2-continued

| Comparative Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Polyamine C2 | 3.0 | 10.0 | | 0.4 | 0.4 | 2.0 | 12.0 | | 0.4 | 0.4 | 2.0 | | 0.4 | 0.4 |
| Polyamine C3 | | | | | | | | | | | | | | |
| Ethylene glycol | 20.0 | 20.0 | 20.0 | 20.0 | 20.0 | 10.0 | 10.0 | 10.0 | 10.0 | 10.0 | 10.0 | 10.0 | 30.0 | 30.0 |
| Urea | 10.0 | 10.0 | 10.0 | | 10.0 | 10.0 | 10.0 | 10.0 | | 10.0 | 10.0 | 10.0 | | 10.0 |
| pH adjuster | 0.3 | 0.3 | 0.3 | 0.3 | 0.3 | 0.1 | 0.1 | 0.1 | 0.1 | 0.1 | 0.3 | 0.3 | 0.3 | 0.3 |
| Surfactant | 0.5 | 0.5 | 0.5 | 0.5 | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance | Balance | Balance | Balance | Balance |
| Water resistence | X | X | ● | O | O | X | X | ● | O | O | X | ● | O | O |
| Age stability | ● | O | X | X | X | ● | O | X | X | X | ● | X | X | X |
| Resistence to drying-up | A | B | D | D | D | A | C | D | D | D | A | D | D | D |

Evaluation of water resistance, age stability and resistance to drying-up in Table 1 and Table 2 is made in the following manner:

Water resistance: Blotting of ink and staining on a writing surface such as writing paper by dipping the surface immediately after writing on it was:

⊙ : none;
○ : a little;
x: present.

Age stability: Abnormalities such as precipitation, thickening after standing in a glass container at 50° C. for 2 months was:

⊙ : none;
○ : a little;
x: present.

Resistance to drying-up: Period when abnormality occurs in the writing after leaving the pen to stand with a cap being removed under the conditions at 40° C., 50% RH was: A: 2 months or more; B: 1 month or more and less than 2 months; C: 7 days or more and less than 1 month; D: less than 7 days.

Polyamines A1-A3 in Table 1 and Table 2 are partial secondary or tertiary polyethyleneimines having a molecular weight of 300 or more and containing primary amino groups in a proportion of 21% or more of the total amino groups present, polyamines B1-B3 are partial secondary or tertiary polyethyleneimines having a molecular weight of 300 or more and containing primary amino groups in a proportion of less than 21% of the total amino groups present, and polyamines C1-C3 are complete secondary or tertiary polyethyleneimines having a molecular weight of 300 or more and containing no primary amino groups but only secondary and/or tertiary amino groups, the contents of primary amino groups and the molecular weights being described in Table A.

TABLE A

| Polyamine Compound | Content of primary amino group | Molecular weight |
|---|---|---|
| Polyamine A1 | 33% | 300 |
| A2 | 25% | 1000 |
| A3 | 25% | 70000 |
| B1 | 3% | 4000 |
| B2 | 10% | 2500 |
| B3 | 20% | 2000 |
| C1 | 0% | 600 |
| C2 | 0% | 4000 |
| C3 | 0% | 140000 |

As the pH adjustors, triethanolamine was used in Examples 1-17, 22-25, Comparative Examples 1-5, 11-14, and sodium hydroxide was used in Examples 18-21 and in the Comparative Examples.

As the surface active agents, an anionic surfactant was used in both Examples and Comparative Examples. An ester phosphate type surfactant is suitable such as GAFAC RS-410.

The present invention as is apparent from the comparison tests described herein, provides an excellent ink composition which by its particular composition has solved the problems of water resistance, age stability and resistance to drying-up which have not hitherto been solved. The water resistant ink composition of the present invention is particularly suitable for water ball point pens or felt tipped pins and exhibits excellent results.

We claim:

1. A water resistant ink composition comprising
   A. a polyamine mixture of (a) a polyamine compound containing primary amino groups and having a molecular weight of 300 or more, (b) one or more polyamine compound(s) selected from polyamine compounds containing secondary and/or tertiary amino groups and having a molecular weight of 300 or more,
   B. a stabilizing agent,
   C. water,
   D. an anionic dye having a solubility of 10% by weight or more in an aqueous vehicle comprising said polyamine mixture, said stabilizing agent and water, wherein the total amount of the polyamine compounds is in the range of 0.5-5% by weight.

2. A water resistant ink composition according to claim 1, wherein the polyamine compound containing primary amino groups and having a molecular weight of 300 or more is a polyamine free of secondary or tertiary amino groups.

3. A water resistant ink composition according to claim 1, wherein the polyamine compound containing primary amino groups and having a molecular weight of 300 or more is a polyamine compound having secondary or tertiary amino groups.

4. A water resistant ink composition according to claim 1 wherein the polyamine compound containing primary amino groups and having a molecular weight of 300 or more is a polyamine compound in which a primary amino group is present in a proportion of 21% or more of the total amino groups contained per molecule, and the polyamine compound is present in an amount of 2-50% by weight of the total polyamine compounds.

5. A water resistant ink composition according to claim 1 wherein the polyamine compound containing primary amino groups and having a molecular weight of 300 or more is a polyamine groups compound in which a primary amino group is present in a proportion of less than 21% of the total amino groups contained per molecule, and the polyamine compound is present in an amount of 10-90% by weight of the total polyamine compounds.

6. A water resistant ink composition according to claim 1 wherein the stabilizing agent is a compound selected from urea, thiourea, ethylene urea, hydroxyethyl urea, hydroxypropyl urea, ethylene thiourea, diethyl thiourea, 2-pyrrolidone, polyvinly pyrrolidone, sorbitol, dimethylsulfone.

7. A water resistant ink composition according to claim 1 further containing a wetting agent selected from ethylene glycol, diethylene glycol, propylene glycol, glycerin, triethylene glycol, dipropylene glycol, thiodiglycol, polyglycerin, polyethylene glycol, polypropylene glycol, methyl cellosolve, ethyl cellosolve, butyl cellosolve, methyl carbitol, ethyl carbitol, butyl carbitol and mixtures thereof.

* * * * *